United States Patent
Lee et al.

(10) Patent No.: US 10,027,787 B2
(45) Date of Patent: Jul. 17, 2018

(54) INTELLIGENT EARPLUG SYSTEM

(71) Applicant: Hush Technology Inc., San Diego, CA (US)

(72) Inventors: Daniel Lee, Framingham, MA (US); Chesong Lee, Framingham, MA (US); Dongyeup D. Synn, Los Angeles, CA (US)

(73) Assignee: Hush Technology Inc., San Diego, CA (US)

( * ) Notice: Subject to any disclaimer, the term of this patent is extended or adjusted under 35 U.S.C. 154(b) by 0 days.

(21) Appl. No.: 15/810,576

(22) Filed: Nov. 13, 2017

(65) Prior Publication Data

US 2018/0084095 A1    Mar. 22, 2018

Related U.S. Application Data

(63) Continuation of application No. 15/348,400, filed on Nov. 10, 2016, which is a continuation-in-part of application No. 15/106,989, filed as application No. PCT/US2015/017165 on Feb. 23, 2015, which is a continuation of application No. PCT/US2015/052498, filed on Sep. 25, 2015.

(60) Provisional application No. 62/055,042, filed on Sep. 25, 2014, provisional application No. 61/943,433, filed on Feb. 23, 2014.

(51) Int. Cl.
| | |
|---|---|
| *H04M 1/00* | (2006.01) |
| *H04R 25/00* | (2006.01) |
| *H04M 1/60* | (2006.01) |
| *G06F 3/16* | (2006.01) |
| *H04M 1/725* | (2006.01) |
| *H04W 4/02* | (2018.01) |
| *H04R 1/10* | (2006.01) |

(52) U.S. Cl.
CPC .......... *H04M 1/6066* (2013.01); *G06F 3/165* (2013.01); *H04M 1/72558* (2013.01); *H04R 1/1041* (2013.01); *H04W 4/02* (2013.01); *H04R 1/1016* (2013.01); *H04R 2420/07* (2013.01); *H04R 2460/03* (2013.01)

(58) Field of Classification Search
CPC   H04R 1/1016; H04R 1/1025; H04R 2420/07; H04R 2460/07; H04R 1/1041; H04R 1/1015; H04R 2460/03; G06F 3/165; H04W 68/00; H04W 4/02; H04M 1/6066; H04M 1/72558
USPC ....................................... 381/380; 455/569.1
See application file for complete search history.

(56) References Cited

U.S. PATENT DOCUMENTS

| | | | |
|---|---|---|---|
| 2008/0019554 A1* | 1/2008 | Krywko | H04R 1/1058 381/380 |
| 2011/0170703 A1* | 7/2011 | Palma | H04R 1/1041 381/74 |

(Continued)

*Primary Examiner* — Sean H Nguyen
(74) *Attorney, Agent, or Firm* — Brian M. Dingman; Dingman IP Law, PC

(57) ABSTRACT

A system includes an earphone having an earplug, a processor, a wireless interface, a battery, a memory, and a speaker, and an electronic device separate from the earphone and in communication with the earphone via the wireless interface. The electronic device transmits audio to the earphone for storage in the memory. The processor of the earphone causes the speakers to play the audio stored in the memory in a loop. The electronic device and the processor of the earphone do not operate the wireless interface continuously after the audio is stored in the memory.

6 Claims, 2 Drawing Sheets

(56) References Cited

U.S. PATENT DOCUMENTS

| | | | |
|---|---|---|---|
| 2014/0112520 A1* | 4/2014 | Knudsen | H04R 1/1083 381/380 |
| 2015/0136148 A1* | 5/2015 | Cheng | A61F 11/08 128/868 |
| 2015/0190284 A1* | 7/2015 | Censo | G10K 11/175 128/867 |

* cited by examiner

US 10,027,787 B2

INTELLIGENT EARPLUG SYSTEM

PRIORITY CLAIM

This application is a continuation of and claims priority to U.S. patent application Ser. No. 15/348,400, filed Nov. 10, 2016, which is a continuation-in-part of and claims priority to U.S. patent application Ser. No. 15/106,989, filed Jun. 21, 2016, which is a national phase filing under 35 U.S.C. § 371 of Patent Cooperation Treaty application PCT/US2015/017165, filed Feb. 23, 2015, which claims the benefit of priority to earlier filed U.S. Provisional Patent Application, having Ser. No. 61/943,433, filed Feb. 23, 2014, entitled, "INTELLIGENT EARPLUG SYSTEM", by Daniel Keewoong Lee, Dongyeup Daniel Synn, and Daniel Chesong Lee.

Application Ser. No. 15/348,400, filed Nov. 10, 2016 is also a continuation of and claims priority to Patent Cooperation Treaty application PCT/US2015/052498, filed Sep. 25, 2015, which claims the benefit of priority to earlier filed U.S. Provisional Patent Application, having Ser. No. 62/055,042, filed Sep. 25, 2014, entitled, "INTELLIGENT EARPLUG SYSTEM", by Daniel Lee.

The applicant notes that the Daniel Lee inventor of the 62/055,042 provisional application and corresponding PCT application is the Daniel Keewoong Lee inventor of the 61/943,433 application and corresponding PCT and U.S. national phase applications.

BACKGROUND OF THE INVENTION

The present teachings disclose a method, apparatus, system and article of manufacture for an earplug device that communicates with at least one electronic device. The present disclosure broadens the functionality of a basic earplug into a "smart" earplug. "Smart" means the disclosed earplug device has advanced computing capabilities and connectivity. The present teachings disclose a speaker, sensors, a wireless transmission module, a battery, and a processor integrated into an earplug device that communicates wirelessly with at least one electronic device.

The present teachings describe how the user can go to sleep wearing the earplug device and still hear an alarm. Further, the alarm that awakens the user is not audible to other people, thereby not disturbing others. The present teachings disclose how the alarm gradually increases in volume, eventually reaching dB levels that will most likely awaken the user. If the user does not wake up for a pre-determined time, the earplug device triggers an alarm from the at least one electronic device to ring as a backup measure. The earplug device also has at least one biometric sensor, such as an accelerometer, that tracks motion of the user at night. This allows for tracking of sleep cycles of the user and allows for a "smart wake up" function. The "smart wake up" function will prevent the alarm from sounding while the user is in rapid eye movement ("REM") sleep to make it easier to wake up.

DESCRIPTION OF THE RELATED ART

Earplugs are a common remedy for people trying to sleep in noisy environments but a major limitation is that a user cannot reliably wake up to alarms. Several people have attempted to solve this problem but none have brought the concept to market. This was because earlier earplug alarm clocks lacked in major features that could give it a favorable product market fit. For example, the hassle in having to charge an earplug alarm clock every day is a major deterrent for regular usage.

SUMMARY

In general, in one aspect, a system includes an earphone having an earplug, a processor, a wireless interface, a battery, a memory, and a speaker, and an electronic device separate from the earphone and in communication with the earphone via the wireless interface. The electronic device transmits audio to the earphone for storage in the memory. The processor of the earphone cause the speakers to play the audio stored in the memory in a loop. The electronic device and the processor of the earphone do not operate the wireless interface continuously after the audio is stored in the memory.

Implementations may include one or more of the following, in any combination. A second earphone may include a second earplug, a second processor, a second wireless interface, a second battery, a second memory, and a second speaker, and the electronic device and the first and second processors of the two earphones may be configured to periodically communicate over the first and second wireless interfaces to keep the audio output by the first and second speakers in sync. The electronic device may be configured to write an audio file to the memory of the earphone over the wireless interface of the earphone. The memory and the processor may be in a single microchip. The earplug may be shaped to fit into an ear canal, such that the speaker may be located more deeply into the ear than may be the earplug. The speaker may be detachable from the electronics base, allowing replacement of the earplug.

The processor of the earphone may receive notifications from the external electronic device, and cause the speaker to produce sounds based on the notifications, and the electronic device may provide a user interface allowing a user to specify which applications executing on the electronic device shall provide notifications to the earphone. The electronic device may provide, to the earphone, GPS information available to the electronic device, and the processor of the earphone may cause the speaker to produce sounds based on the GPS information. The electronic device may provide a user interface allowing a user to specify a set of contacts from a list of contacts known to the electronic device, such that only calls from those contacts result in call notifications being sent to the earphone.

The processor of the earphone and the electronic device may communicate over the wireless interface at a rate lower than a rate used for transmitting data, when data is not being transmitted, to maximize battery life of the earphone. The processor may determine a received signal strength indicator (RSSI) of a connection to the electronic device, and use the RSSI to track the location of the earphone. The earphone may include a sensor, and when the earphone is located in a user's ear, the sensor may detect data indicative of the state of sleep of the user and provide that data to the processor, with the processor of the earphone configured to cause the speaker to provide sound to the user based on the sensor data. The processor may cause the speaker to provide a sound when the sensor data indicates that the user is in REM sleep. The sensor may include an accelerometer, and the determination that the user is in REM sleep may be based on head movement detected by the accelerometer. The sensor may include one or more of a movement sensor, a temperature sensor, or a heart rate sensor.

In general, in one aspect, an earphone includes an earplug, a processor, a wireless interface, a battery, a memory, and a speaker. The processor receives audio from an electronic device separate from the earphone and in communication with the earphone via the wireless interface, stores the received audio in the memory, causes the speaker to play the audio stored in the memory in a loop, and does not operate the wireless interface continuously after the audio is stored in the memory.

Implementations may include one or more of the following, in any combination. A second earphone separate from the first earphone and from the electronic device may include a second earplug, a second processor, a second wireless interface, a second battery, a second memory, and a second speaker, and the first and second processors of the two earphones may periodically communicate with the electronic device separate from the earphones over the first and second wireless interfaces to keep the audio output by the first and second speakers in sync. The processor may allow the electronic device to write an audio file to the memory of the earphone over the wireless interface of the earphone. The memory and the processor may be in a single microchip. The earplug may be shaped to fit into an ear canal, such that the speaker may be located more deeply into the ear than may be the earplug. The speaker may be detachable from the electronics base, allowing replacement of the earplug.

All examples and features mentioned above can be combined in any technically possible way. Other features and advantages will be apparent from the description and the claims.

BRIEF DESCRIPTION OF THE DRAWINGS

Embodiments of the present disclosure will be more readily understood by reference to the following figures, in which like reference numbers and designations indicate like elements.

DETAILED DESCRIPTION

Figure 1:
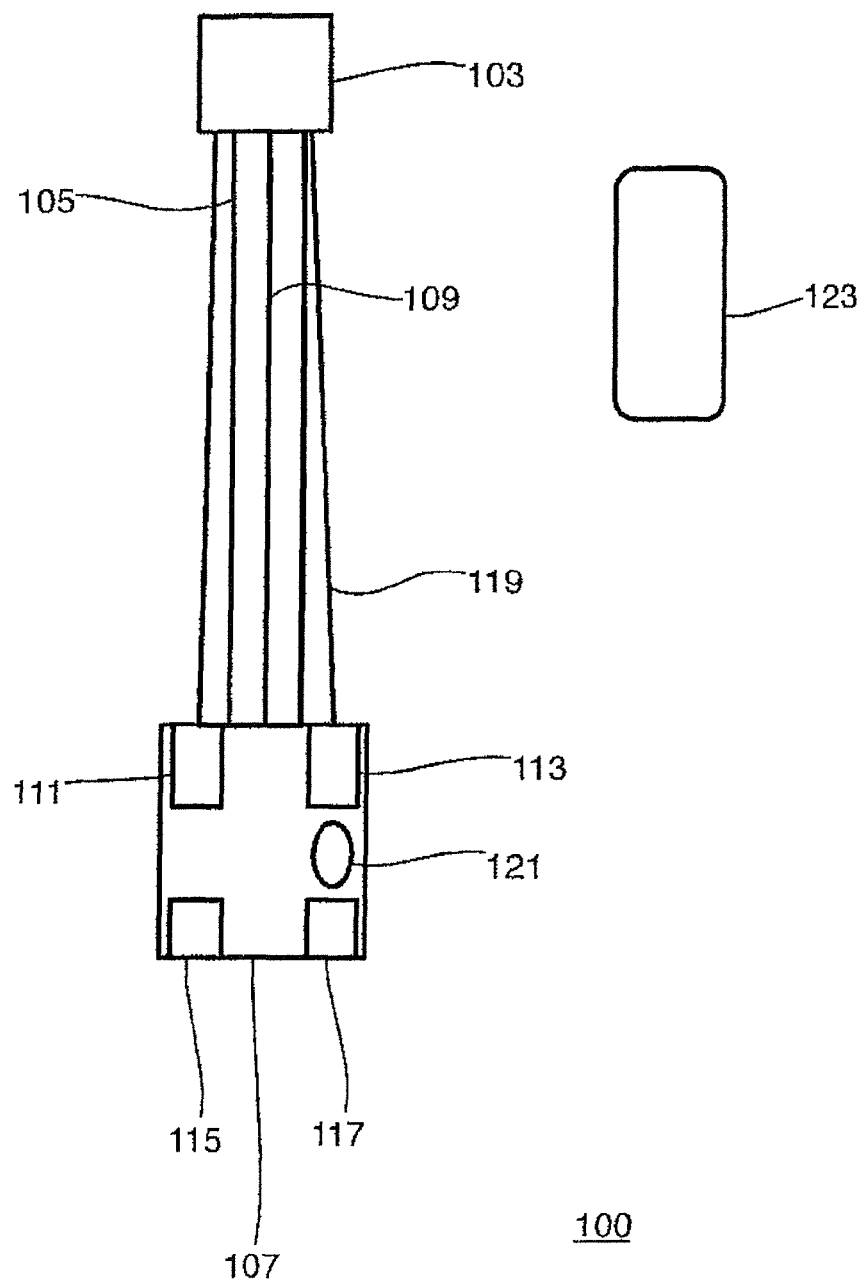
FIG. 1 illustrates an earplug apparatus, wherein a speaker, sensors, and a wireless transmission module communicate with at least one electronic device, according to one embodiment of the present teachings.

It will be appreciated that the earplug device may be used in a variety of settings. The following list is not an exhaustive list but is meant to assist in understanding the earplug device. As an example, students in noisy college environments who have to wake up and not disturb roommates may wear the earplug device. Another example applies to public transit commuters who take a nap and have to wake up when they approach their designated stop areas. Other examples are couples with a snoring partner where the other partner has to wake up at a certain time; people who desire to monitor their sleep; people who choose to use smart technology to optimize their sleep; people who have trouble sleeping and use binaural/isochronic/monaural beats to help them fall asleep; people who take a nap in quiet locations and not want to disturb others with their alarm, e.g., students studying at a library. The earplug device may also take advantage of additional technology available in the smartphone platform. For example, the earplug device may use a smartphone's GPS to track when the user nears a location and to sound the alarm accordingly.

The earplug device also implements the use of binaural beats by playing slightly different frequencies in each ear that causes a beat to be formed in the user's head. This causes "brain entrainment," a process whereby an operating frequency of a brain aligns itself with a binaural beat formed. Lucid dreaming communities value binaural beats to help them achieve an appropriate state of mind. The lucid dreaming communities may find wearing the earplug device useful because it may trigger a soft alarm during deep REM cycle; this is done so that the user is notified inside of her dream that she is dreaming. Brain entrainment helps induce sleep. Brain entrainment may also be used with the earplug device to stimulate other desired brain states, such as focus and alertness. The earplug device may also utilize received signal strength indicator ("RSSI") proximity sensing to allow for tracking of the earplug device if misplaced. RSSI measures power present in a received radio signal.

The present disclosure overcomes a myriad of limitations due to an inability to hear certain sounds, for example, an alarm, while wearing earplugs. The present disclosure has additional functionalities. The embodiments set forth are offered to assist in understanding other functionalities of the earplug device and do not represent an exhaustive list. In one embodiment, the earplug device may set iOS applications to send notifications other than alarm clocks. "iOS" is a mobile operating system previously known as iPhone operating system. The user may choose from a list of contacts to have the earplug device send her a notification when certain people call. In one embodiment, the earplug device may connect to other devices, such as a baby monitor. The baby monitor may trigger the alarm to alert a mother to the needs of her baby. In one embodiment, the earplug device includes an ear bone microphone for applications in allowing for easy to hear phone calls in loud environments. For example, a construction worker may use the earplug device in the loud environments. Noise reduction component of the earplugs may allow the user to hear conversations clearly as an ear bone conduction component allows a voice of a user to come through clearly. In one embodiment, the earplug device may stream music into speakers, which may be set to play a preset playlist for a pre-determined amount of time at night.

The present teachings disclose how users may enjoy benefits of noise masking earplugs while utilizing functions enabled by a speaker and sensors. The present teachings describe how to make and use a high technology earplug device that is not currently available in the art.

Referring now generally to FIG. 1, one embodiment of an earplug apparatus 100 is disclosed. The earplug apparatus 100 generally comprises a speaker 103, an earplug 105, an electronics base 107, a cable 109, sensors 111, a wireless transmission module 113, a battery 115, a processor 117, a replaceable foam earplug 119, an accelerometer 121, and at least one electronic device 123.

Connecting the speaker 103 to the electronics base 107 with the cable 109 may allow the speaker 103 to be easily detached from the electronics base 107. In one embodiment, the cable 109 may be a threaded cable. Easy detachment of the speaker 103 from the electronics base 107 is useful because the earplug 105 may be easily replaced. When the speaker 103 is removed from the electronics base 107, the earplug 105 can be slipped off a wiring of the speaker 103, replaced with a new one, and then put back onto the electronics base 107.

The speaker 103 may be designed with a variety of different technologies. In one embodiment, the earplug device may utilize a piezoelectric transducer, which is a device that converts electrical pulses to mechanical vibrations. In one embodiment, the earplug device may use a balanced armature, which is a sound transducer design that increases electrical efficiency. The piezoelectric sensor and/or the balanced armature may be used to handle tight space constraints and to minimize energy consumption. In one embodiment, the speaker 103 may be designed by a variety of different technologies, such as, and is not limited to, electromagnetics and thermo acoustics. In one embodiment, the speaker 103 may serve as a buzzer and may vibrate instead of produce sound.

The speaker 103 is positioned as deep into an ear canal as possible to further minimize energy consumption. The cable 109 goes from the speaker 103 through the earplug 105 and to the electronics base 107. This allows for replacement of an actual earplug component with the replaceable foam earplug 119 for hygienic purposes.

Standard foam earplugs for noise reduction are usually rolled up to fit into the ear canal. In one embodiment, a custom foam (polyurethane) earplug 105 with a small axial hole where the cable 109 passes through may be used. The custom foam (polyurethane) earplug 105 minimizes noise that goes through the earplug into the ear canal in order to achieve a higher noise reduction rating ("NRR"). The NRR is a unit of measurement that determines effectiveness of hearing protection devices to decrease sound exposure in an environment. A higher NRR indicates a greater potential for noise reduction. In another embodiment, silicone earplugs may be used for greater durability.

The electronics base 107 is comprised of a housing. In one embodiment, the housing may be made of smooth plastic to resist the tendency of the earplug to catch on an edge and be pulled out of the ear. The housing is ergonomically designed to distribute any load evenly over an outer ear.

The sensors 111, the wireless transmission module 113, the processor 117, and the battery 115 are brought together on a central printed circuit board which is placed inside the housing of the electronics base 107. In one embodiment, the housing may have a threaded hole that connects to an axial jack through which the speaker 103 connects to electronic components. In one embodiment, a speaker wiring may have a certain length so that it can traverse through a length of the earplug.

In one embodiment, the earplug device utilizes Bluetooth low energy ("BLE") as the wireless transmission module 113 to minimize energy consumption. With the advent of BLE technology, there is a growing trend of imaginative "smart" devices, enabling basic objects to have additional functionality. BLE technology uses less power consumption within a similar communication range. This means that while similar earplug device designs require nightly recharging, the user of this earplug device does not have to do so. A ping rate of a wireless signal should be very low as to preserve energy because a one-second delay on the alarm is inconsequential to an alarm clock functionality. "Ping" is an acronym for Packet Internet or Inter-Network Groper. The ping rate is a response time for a system to speak to a server. The present teachings disclose that a lower ping rate is better than a higher ping rate as it entails significant energy savings.

In one embodiment, the battery 115 may be a traditional coin cell battery because of the high internal resistance and low maximum current values. Using the traditional coin cell battery takes advantage of BLE's low current requirements, which allows for prolonged usage on a single battery.

The processor 117 may be integrated into a system-on-chip solution package with the wireless transmission module 113. In one embodiment, a simple microcontroller may receive a signal from the wireless transmission module 113 and output a corresponding electrical signal.

In one embodiment, the sensors 111 for acquiring biometric data may be in the form of the accelerometer 121, a temperature sensor, or a photo sensor. Movements of people, temperature, and heart rate vary predictably through different sleep phases. The sensors 111 correlate the movement-temperature data to analyze and predict when the user is in a certain stage of sleep. This information would be used in a form of a bio-clock, where users would be awakened in a pre-determined time frame when they are in a lighter phase of sleep.

As indicated above, in one embodiment, the accelerometer 121 acts as one of the sensors 111. The accelerometer 121 is a device that measures acceleration. The accelerometer 121 tracks head movements during sleep to monitor REM cycles of the user and wake him up during a lighter phase of sleep. People wake up feeling groggy if they awaken during REM sleep. Using the accelerometer 121 prevents waking the user up during his REM cycle.

The at least one electronic device 123 is any device with advanced computing and wireless connectivity capabilities, such as smartphones.

Figure 2:
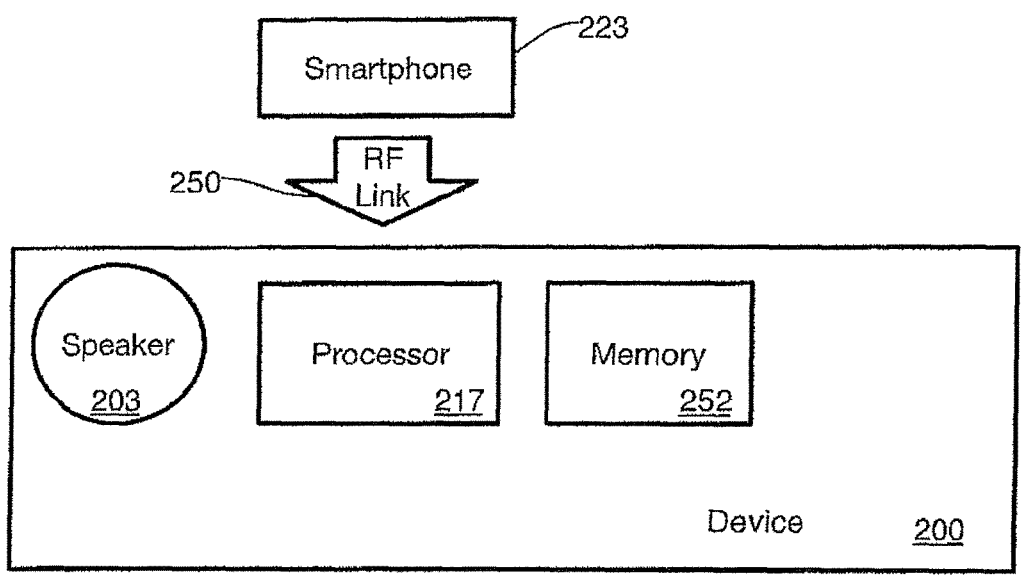
FIG. 2 illustrates a smart earplug system, according to one embodiment of the present teachings.

For RF devices that are intended to be disposed upon a human head all night, radiation exposure is a health concern, particularly for a device that will be playing audio for 8 or more hours a night. Referring now to FIG. 2, in one embodiment, a smart earplug device 200 is illustrated. The smart earplug device 200 is adapted such that it does not stream audio continuously throughout the night, which would mean that the RF communications link 250 is connecting continuously at a fast rate. Instead, we upload sounds to the smart earplug device 200 onboard memory 252 itself that are then looped throughout the night. By playing back stored audio flies instead of streaming them over Bluetooth constantly, we achieve ultra-low radiation exposure. Simultaneously, this brings the added benefit of achieving much higher audio playback times, so smaller batteries can be used, which in turn allows for smaller ear mounted devices. In this configuration, users of the smart earplug device 200 will be exposed to less Bluetooth radiation than a businessperson is exposed to in a single phone call when using a Bluetooth headset.

In one embodiment of the smart earplug device 200, an on-board memory 252 that can be rewritten over-the-air through an RF link 250 (e.g. Bluetooth) by a paired controlling device 223 (e.g. smartphone) with new audio files. The smart earplug device 200 has a processor or decoder 217 that then pulls the audio file from the memory 252 and then plays it on a speaker 203. This audio file can be played and looped for the entire night without having to constantly stream files over Bluetooth, and done in a very power-conserving fashion.

The use case scenario for our implementation of the smart earplug device 200 is that the user selects an audio track that he/she wants to play on a smartphone and presses upload. The audio track is uploaded into the earplugs and then is looped continuously. The smartphone occasionally reconnects with the earplugs (e.g. ~1 reconnect per second) to maintain a connection to send over occasional information if necessary (e.g. a sync command to ensure the left and right earplug are time-matched. In one variation, the smart earplug device 200 is instructed to turn off after a certain time period.)

This is also beneficial because the memory size needed on the chip itself can be very small since the bulk of the audio files are stored on the paired device (smartphone) and only the audio file being played at the moment is taking up memory on the earplugs. This means only a very small amount of memory space is required on the earplugs. This is very convenient as the flash memory that is often manufactured onto the same chip as a microcontroller can be sufficiently large enough to store the active audio file—meaning a separate flash module may not be needed, saving cost/space/complexity.

In one embodiment, the smart earplug device 200 is in the implementation of two components: one in-ear device with a small amount of flash memory and a master controlling device (smartphone). The smartphone has multiple audio files to select from. The user chooses one of the short audio clips and uploads it onto the small amount of flash memory on the in-ear device. The in-ear device loops that sound all through the night, and is able to loop it through the night on a small battery because of the reduced power consumption of not having the power overhead of maintaining a constant Bluetooth connection. Also as a result of not constantly streaming in a Bluetooth connection, the user is exposed to minimal Bluetooth radiation, less than what a businessman is exposed to during a single phone call using a Bluetooth headset.

Although the disclosed embodiments have been described employing a smart earplug device 200, literally any wireless head-mounted device may be adapted using the principals and methods described herein to reduce radiation exposure to a user, which may also readily maintain a small form factor.

Those skilled in the art will appreciate that the present teachings may be practiced with other system configurations, including hand-held devices, multiprocessor systems, microprocessor-based or programmable consumer electronics, network PC's, minicomputers, mainframe computers, and the like. The present teachings may also be practiced in distributed computing environments where tasks are performed by remote processing devices that are linked through a communications network. In a distributed computing environment, program modules may be located in both local and remote memory storage devices.

The computer described herein above may operate in a networked environment using logical connections to one or more remote computers. These logical connections can be achieved using a communication device that is coupled to or be a part of the computer; the present teachings are not limited to a particular type of communications device. The remote computer may be another computer, a server, a router, a network PC, a client, a peer device or other common network node, and typically includes many or all of the elements described above relative to the computer. The logical connections include a local-area network (LAN) and a wide-area network (WAN). Such networking environments are commonplace in office networks, enterprise-wide computer networks, intranets and the Internet, which are all types of networks.

When used in a LAN-networking environment, the computer is connected to the local network through a network interface or adapter, which is one type of communications device. When used in a WAN-networking environment, the computer typically includes a modem, a type of communications device, or any other type of communications device for establishing communications over the wide area network, such as the Internet.

The foregoing description illustrates exemplary implementations, and novel features, of aspects of an earplug device that communicates with at least one electronic device. Alternative implementations are suggested, but it is impractical to list all alternative implementations of the present teachings. Therefore, the scope of the presented disclosure should be determined only by reference to the appended claims, and should not be limited by features illustrated in the foregoing description except insofar as such limitation is recited in an appended claim. While the above description has pointed out novel features of the present disclosure as applied to various embodiments, the skilled person will understand that various omissions, substitutions, permutations, and changes in the form and details of the present teachings illustrated may be made without departing from the scope of the present teachings.

Each practical and novel combination of the elements and alternatives described hereinabove, and each practical combination of equivalents to such elements, is contemplated as an embodiment of the present teachings. Because many more element combinations are contemplated as embodiments of the present teachings than can reasonably be explicitly enumerated herein, the scope of the present teachings is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art. Furthermore, to the extent that the term "includes" is used in either the detailed description or the claims, such term is intended to be inclusive in a manner similar to the term "comprising."

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising:
   an electronics base comprising a housing containing a printed circuit board;
   a speaker;
   an earplug positioned between the electronics base and the speaker and having a length between the earplug and the speaker, the earplug comprising an axial hole along the entire length of the earplug; and
   a cable connecting the speaker to a jack on the printed circuit board through a hole in the housing;
   wherein
   the cable is detachable from the jack,
   the cable passes through the entire length of the axial hole in the earplug, and
   when the cable is detached from the jack, the earplug is removable from the cable by the earplug slipping off the cable, allowing replacement of the earplug with a replacement earplug having a length and an axial hole along the entire length of the replacement' earplug, wherein the replacement comprises passing the cable through the entire length of the axial hole in the replacement earplug.

2. The apparatus of claim 1, wherein the cable is threaded for coupling to the hole in the housing.

3. The apparatus of claim 1, wherein the earplug comprises polyurethane foam.

4. The apparatus of claim 1, wherein the earplug comprises silicone.

5. The apparatus of claim 1, further comprising a processor and battery coupled to the printed circuit board.

6. An apparatus comprising:
- an electronics base comprising a housing containing a printed circuit board, with a processor and battery coupled to the printed circuit board;
- a speaker;
- an earplug positioned between the electronics base and the speaker and having a between the earplug aid the speaker, the earplug comprising an axial hole along the entire length of the earplug, wherein the earplug comprises at least one of polyurethane foam and silicone; and
- a cable connecting the speaker to a jack on the printed circuit board through a hole in the housing;

wherein
the cable is detachable from the jack,
the cable is threaded for coupling to the hole in the housing,
the cable passes through the entire length of the axial hole in the earplug, and
when the cable is detached from the jack, the earplug is removable from the cable by the earplug slipping off the cable, allowing replacement of the earplug with a replacement earplug having a length and an axial hole along the entire length of the replacement earplug, wherein the replacement comprises passing the cable through the entire length of the axial hole in the replacement earplug.

* * * * *